No. 654,595. Patented July 31, 1900.
E. J. BERG.
METHOD OF OPERATING DYNAMO ELECTRIC MACHINES.
(Application filed May 26, 1900.)
(No Model.)
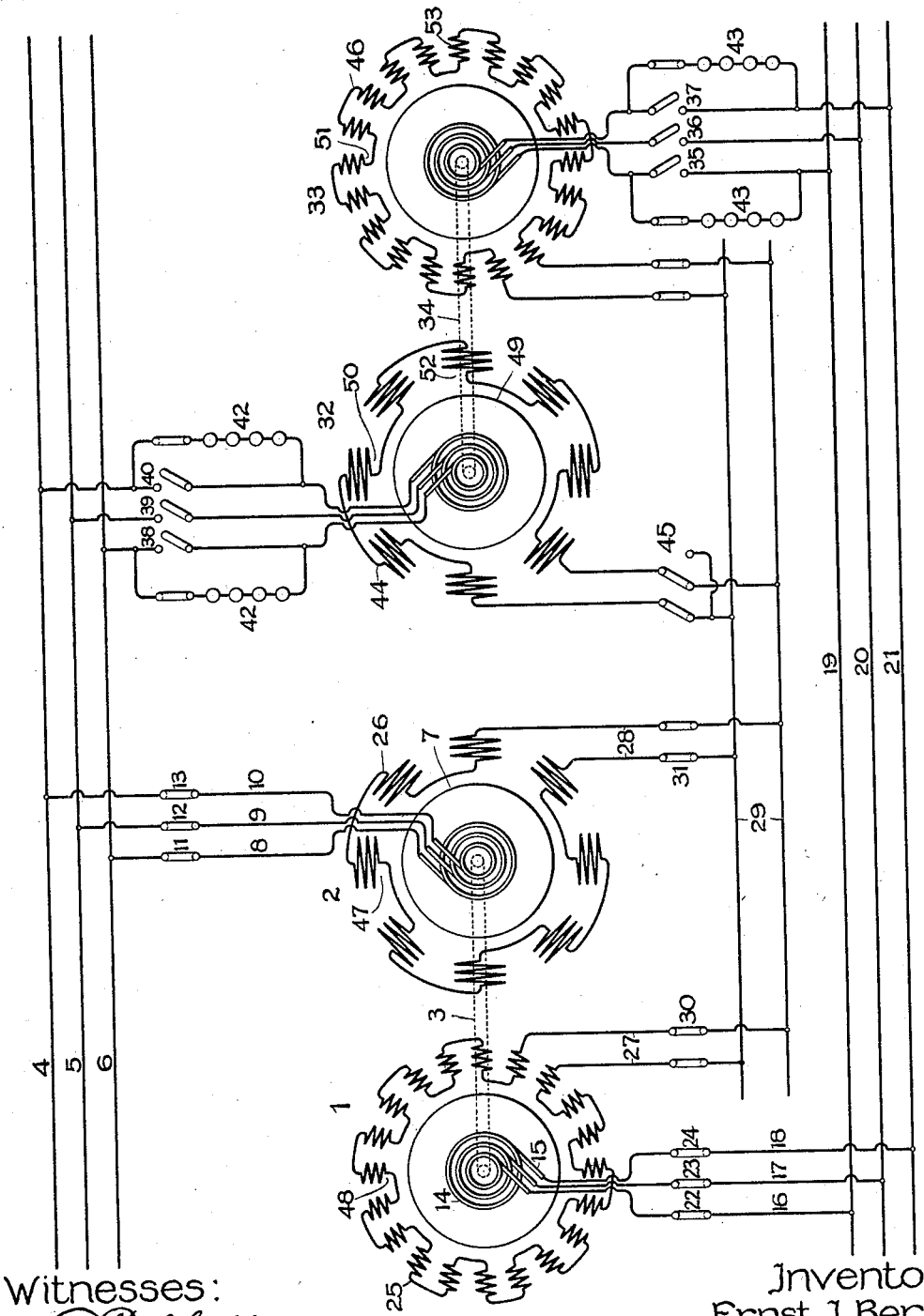
Witnesses:
Lewis B. Abell.
Alexander D. Lunt.
Inventor,
Ernst J. Berg,
by Albert G. Davis
Atty.

UNITED STATES PATENT OFFICE.

ERNST J. BERG, OF SCHENECTADY, NEW YORK, ASSIGNOR TO THE GENERAL ELECTRIC COMPANY, OF NEW YORK.

METHOD OF OPERATING DYNAMO-ELECTRIC MACHINES.

SPECIFICATION forming part of Letters Patent No. 654,595, dated July 31, 1900.

Application filed May 26, 1900. Serial No. 18,034. (No model.)

*To all whom it may concern:*

Be it known that I, ERNST J. BERG, a citizen of the United States, residing at Schenectady, county of Schenectady, State of New York, have invented certain new and useful Improvements in Methods of Operating Dynamo-Electric Machines, (Case No. 1,219,) of which the following is a specification.

My present invention relates to the operation of dynamo-electric machines of the synchronous type, and comprises a method of adjusting the angular position of the rotating member of such a machine. The application of this method is of use in many relations; but I have found it of particular value in cases where it is desired to operate frequency-changing motor-generator sets in multiple with each other. Motor-generators of this character necessarily have a different number of poles on the motor than on the generator, by reason of which fact it is possible for the motor ends of the sets to be in synchronism at certain relative positions of their rotating members, while at the same instant the generator ends have such relative phase relations as to prevent their being thrown in multiple with each other.

My invention in its principle, as well as mode of application, will be better understood by reference to the following description, taken in connection with the accompanying drawing, while its novel features will be particularly pointed out in the appended claims.

The drawing represents two motor-generator sets together with the coöperating mains, exciter-circuits, and other features.

At 1 and 2, respectively, I have indicated in diagram a generator and a motor comprising a single motor-generator set, the motor and generator being supposed to have their rotating members mounted upon the same shaft or upon shafts mechanically coupled together, the dotted lines 3 signifying some rigid mechanical connection between the machines.

Three-phase supply-mains are shown at 4, 5, and 6, to which mains current of some suitable frequency—as, for instance, twenty-five cycles—is supplied. This current is transmitted to the armature 7 of the motor 2 by leads 8 9 10, connected to the mains 4 5 6 through the usual switches 11, 12, and 13. In a similar manner the armature-winding of the generator 1 is connected through collector-rings 14 and sliding contacts 15 to leads 16 17 18, branching from another set of three-phase mains 19, 20, and 21. The usual main-switches 22, 23, and 24 are provided in circuit with the leads 16 17 18.

The field-windings of the motor and generator, respectively, are indicated at 25 and 26 and are supplied with direct current through branch leads 27 and 28, connected to the exciter-circuit 29, which leads to some suitable source of direct current. (Not shown.) The field-circuits of the machines are provided with circuit opening and closing switches 30 and 31.

The motor 2 is shown with eight poles, while the generator 1, which is driven by the motor, is provided with twenty poles. The ratio of frequencies in the two machines is therefore as eight to twenty, and since twenty-five-cycle current is supposed to be supplied to the motor 2 it follows that the current produced by the generator 1 will be approximately sixty cycles.

At 32 and 33 I have shown a motor and a generator rigidly coupled together, as by means of a shaft, (indicated in dotted lines at 34,) the combination of machines constituting another motor-generator set exactly similar to that already described, the motor being, as in the first instance, provided with eight poles and the generator with twenty. The generator end of this last-mentioned motor-generator set is adapted to be connected to the mains 19, 20, and 21 through main-switches, (indicated at 35, 36, and 37.) In a similar manner the motor 32 may be connected to the mains 4 5 6 by closing the switches 38 39 40, connected in the leads to the motor-armature. The usual synchronizing-lamps are arranged across two of the switches of each set of leads, one set of synchronizing-lamps being indicated in the drawings at 42, this set serving to indicate synchronism of the motor, while another set of synchronizing-lamps is shown at 43, the latter set acting to indicate synchronism of the generator. It is to be understood, of course, that the motor-generator set 1 2 may be similarly supplied with synchronizing-lamps or similar devices, if desired.

The field-circuit 44 of the motor 32 is supplied with direct current from the exciter-mains 29 and is connected thereto through a reversing-switch of any suitable form—such, for example, as indicated diagrammatically at 45. The field-circuit 46 of the generator 33 is also connected to the exciter-mains 29, as shown, and, if desired, a reversing-switch may also be included in this field-circuit.

Supposing now the motor-generator set 1 2 be connected to the respective sets of mains 4 5 6 and 19 20 21, whereby current of one frequency supplied from one of the sets of mains will be converted into a different frequency and supplied to the other set of mains, then, owing to the rigid mechanical connection between the motor and generator of the motor-generator set, it will be obvious that there would be a certain definite relation between the sequence of phases in the two circuits, depending upon the angle at which the armatures of the two machines are coupled together. Thus, as a concrete example, suppose an armature-conductor connected to the lead 9 to be in a position under the pole 47 at some particular instant. The armature of the generator 1 may at this instant occupy any selected angular position, depending upon the manner in which it is coupled to the armature 7. For example, let the two armatures be coupled together so that an armature-conductor connected to the lead 17 of the generator 1 lies under the pole 48 of the generator at the same instant that the aforesaid armature-conductor of the motor lies under the pole 47. If the motor and generator 32 and 33 occupy the same relation to each other as the motor 1 and generator 2, then the two sets may be thrown in parallel with each other at an instant when the motors are in synchronism with each other and the generators also. This may be done when a conductor connected to the main 39 and lying upon the armature 49 of the motor 32 is in a position, for example, under the pole 50, while at the same time an armature-conductor of the generator 33, connected to the lead 36, lies under the pole 51. In this arrangement, which is specified merely by way of example, it will be seen that if the poles 47 50 are of the same polarity and the poles 48 51 also of like polarity to each other then the generator electromotive forces will be in phase with each other at the same time that the electromotive forces of the motors are in phase, thereby permitting the motor-generator sets to be thrown in multiple with each other. Supposing, however, that the motor-generator set 32 33 catches in synchronism not at the instant supposed, but in a position displaced by ninety degrees. The conductor upon the armature 49, taken by way of illustration, will then be lying under the pole 52, which is of the same polarity as the pole 50.

The motor electromotive forces of the machines 2 and 32 will then be in synchronism with each other, the same as when the conductor referred to was under the pole 50. It will be noted, however, that the conductor on the armature of the generator 33, which heretofore lay under the pole 51, is now in a position under the pole 53 of opposite polarity, by reason of which the electromotive forces which would be impressed upon the mains 35, 36, and 37 by the generator 33 are no longer in phase with the electromotive forces impressed upon the leads 16 17 18 by the generator 1, so that the two generators cannot be thrown into multiple with each other even though their respective motors are operating in synchronism. To overcome this difficulty, I make use of some means for causing the motor to slip until a position is reached when both motors and generators can be thrown into multiple with each other. Various means may be employed for accomplishing this result, and in the drawing I have shown one which is particularly useful because of its simplicity and low first cost. This consists of the reversing-switch 45, placed in circuit with the field 44 of the motor. The reversing-switch is first moved until the field is open-circuited. The motor then continues to run synchronously, but excites its own field by armature reaction. A further movement of the reversing-switch sends current through the field-winding in the opposite direction, thus reversing the field and causing the armature to slip back a pole. A repetition of the successive reversals of the field causes the armature to slip from pole to pole, thereby causing a relative movement between the armature of the generator 33, driven thereby, and the armature of the generator 1 of the other motor-generator set. By causing the armature of the motor-generator set 32 and 33 to slip sufficiently the relation of the armatures of the two sets may be made such that they may be thrown in multiple with each other, as will readily be seen. The phase-lamps 42 and 43 serve to indicate when two sets are in synchronism, the phase-lamps going out when this point is reached.

As my invention relates more particularly to a method of operation, I do not wish my claims to be limited in their application to the use of any particular apparatus for performing the operations specified.

What I claim as new, and desire to secure by Letters Patent of the United States, is—

1. The method of adjusting the angular position of the rotating member of a synchronous dynamo-electric machine which consists in causing said member to slip until the desired angular position is secured and then checking any further slip.

2. The method of connecting motor-generators in multiple with each other which consists in causing one set to slip from synchronism until both of its members come into synchronism at the same instant with the corresponding members of another motor-generator set, and then causing the motor-generators to run synchronously.

3. The method of causing the rotating member of a synchronous dynamo-electric machine to slip which consists in reversing its field.

4. The method of causing the rotating member of a synchronous dynamo-electric machine to slip, which consists in reversing the direction of current through its field-windings.

5. The method of causing the rotating member of a synchronous dynamo-electric machine to slip, which consists in successively reversing its field.

In witness whereof I have hereunto set my hand this 24th day of May, 1900.

ERNST J. BERG.

Witnesses:
BENJAMIN B. HULL,
MABEL E. JACOBSON.